Fig. 1

Inventor
Percival T. Gates, Jr.
By Cadwallader, Kelly & Dacey
Attorneys

United States Patent Office 3,398,279
Patented Aug. 20, 1968

3,398,279
RADIOMETER HAVING A WIDE RANGE OF SPECTRAL RESPONSE
Percival T. Gates, Jr., Weston, Mass., assignor to EG & G, Inc., a corporation of Massachusetts
Filed Dec. 1, 1964, Ser. No. 415,098
13 Claims. (Cl. 250—83.3)

ABSTRACT OF THE DISCLOSURE

Radiometer including a radiation detector that produces an electric current related to the level of radiation incident thereon; an amplifier capable of maintaining its input terminal substantially at zero potential; circuits connecting the radiation detector to the input of the amplifier; feedback system connected between the input and the output of the amplifier including a plurality of resistors and capacitors; switching means adapted to select the desired resistors and/or capacitors as the operational feedback circuit between the input and the output of the amplifier; ambient radiation compensation means connected to the input of the amplifier and adapted to compensate for the level of ambient radiation; a calibrated indicator and associated circuitry connected to monitor the current in the feedback element which is proportional to the intensity of the incident radiation being measured; and a plurality of trimming potentiometers including switching circuits adapted to apply trimming potentials to the indicator to compensate for inexactness in the values of the resistors and capacitors.

Introduction

The present invention relates generally to light evaluation systems and, more particularly, to a radiometer for use in the evaluation of pulsed and steady light sources. The radiometer of the invention is characterized by a wide range of spectral response and a dynamic range and sensitivity that make it eminently suited to handling a variety of light source evaluation problems. The radiometer of the invention is characterized by a wide range of spectral response and a dynamic range and sensitivity that make it eminently suited to handling a variety of light source evaluation problems. The radiometer of the invention is also adapted to measure heat.

Light evaluation systems heretofore known have either been able to measure high-speed light flashes or measure steady-state sources, with a separate instrument needed to perform each measurement. Furthermore, such devices have measured the total amount of integrated light, i.e., both the intensity of the light flash as well as that of the ambient light. This inherent disadvantage of present-day systems in measuring only the combined amount of light entering the system, that is both from the ambient source and the source desired to be measured, is particularly pronounced in instances when such measurements are to be undertaken in bright environments such as in full sunlight. Also, heretofore known systems are cumbersome and inexact in measuring the light intensity of narrow beams such as the output of lasers. In addition, the known systems are rather complex, requiring a great variety of component parts, and hence are expensive.

In the present invention these shortcomings are diminished. According to the invention, a radiometer is provided whereby the desired and only the desired unknown pulsed or steady light source may be simply and accurately measured even in direct sunlight. The radiometer of the invention, because of its inherently stable electronic components, is particularly adapted for consistent repetitive evaluations of a number of light measuring problems. It has been designed to meet the rigid requirements for performance validation imposed on makers of light sources and to provide engineers with reliable light measurements. The radiometer is provided with a readout that may be conveniently converted into light source data in absolute units such as watts per square centimeter or joules per square centimeter. The term "light" is used in this specification and in the appended claims to define not just visible light but rather any known radiation such as, for example, X-rays, gamma rays, thermal and fast neutrons, etc. Specific and interchangeable detectors supplied with the system are also calibrated to provide photometric data in lumens per square feet intended for visual applications.

Objects

Therefore, a principal object of the present invention is to provide an improved light evaluation system capable of evaluating both pulsed and steady light sources. More specifically, an object of the present invention is to provide a radiometer having a wide range of spectral response and a dynamic range and sensitivity that make it particularly suited to evaluate and measure a great variety of light sources.

Another object of the present invention is to provide a radiometer that will measure both the average light power generated by a steady source or a pulse train as well as the integrated light energy generated by a single pulse or a burst of pulses.

Still another object of the present invention is to provide a radiometer system that will measure only the unknown light source desired to be measured under all ambient light conditions, including direct sunlight.

A still further object of the present invention is to provide a radiometer system adapted to measure accurately the light intensity of a narrow beam of light such as that obtained from a laser.

Still another object of the present invention is to provide a radiometer system that will permit visual display on a suitable oscilloscope of the peak light power, the pulse duration, and the rise and fall times of waveforms of pulsed or modulated light.

A further object of the present invention is to provide a radiometer system for the evaluation and measurement of heat intensities.

Other and further objects and advantages of the present invention will in part be obvious and will in part be apparent from the following detailed description, the accompanying drawings, and the appended claims.

The invention accordingly comprises the improved radiometer system possessing the construction, combination of elements, and arrangement of parts which are exemplified in the following detailed disclosure, and the scope of which will be indicated in the appended claims.

Summary of the Invention

In general, the radiometer of the present invention comprises: a device that will produce an electric current related to the level of radiation incident thereon such as a photo-cell, a photo-multiplier tube, an ion chamber, etc.; an amplifier having an input and an output, such as an operational amplifier having a gain of at least —200 and being characterized by an inherent tendency to maintain its input terminal at substantially zero potential; circuit means for operationally coupling the device to the input of the amplifier; a feedback system connected between the input and the output of the amplifier and including a plurality of different resistors and a plurality of different capacitors and a number of paired resistors and capacitors connected in parallel; switching means for selecting one of the resistors or one of the capacitors or one pair of the paired resistors and capacitors connected in parallel to function as the operational feedback element between the input and output of the amplifier; an ambient compensation means coupled to the input of the amplifier and including a second device that will produce an electric current related to the level of incident radiation and a light emitting means mounted adjacent the second device for emitting light of variable intensity to impinge on said second device; and a calibrated readout means for monitoring the electrical value of the current in the selected operational feedback element, whereby the current developed across the selected operational feedback element will be proportional to the intensity of incident radiation desired to be measured regardless of the intensity of the ambient radiation.

The radiometer of the invention will function either by connecting it into any conventional alternating source of electric power such as a 110–120 v. 60 c.p.s. source, or the radiometer may be supplied with electric power internally by a rechargeable battery, making it particularly adaptable for use in the field. Its transducer is normally energized by direct-current electric power from a source within the system, but it is also adapted to be energized from an independent, external direct-current electric power source. Furthermore, the output of the transducer is normally connected to the radiometer system for direct meter readout, but it may also be connected to an outside display unit, such as a cathode ray tube, when it is desired visually to observe the peak light power or the pulse duration and rise and fall time of waveforms of pulsed or modulated light

*Description of the figures*

For a fuller understanding of the nature and objects of the invention, reference should be had to the following detailed description, taken in connection with the accompanying drawings wherein.

*General*

Figure 1:
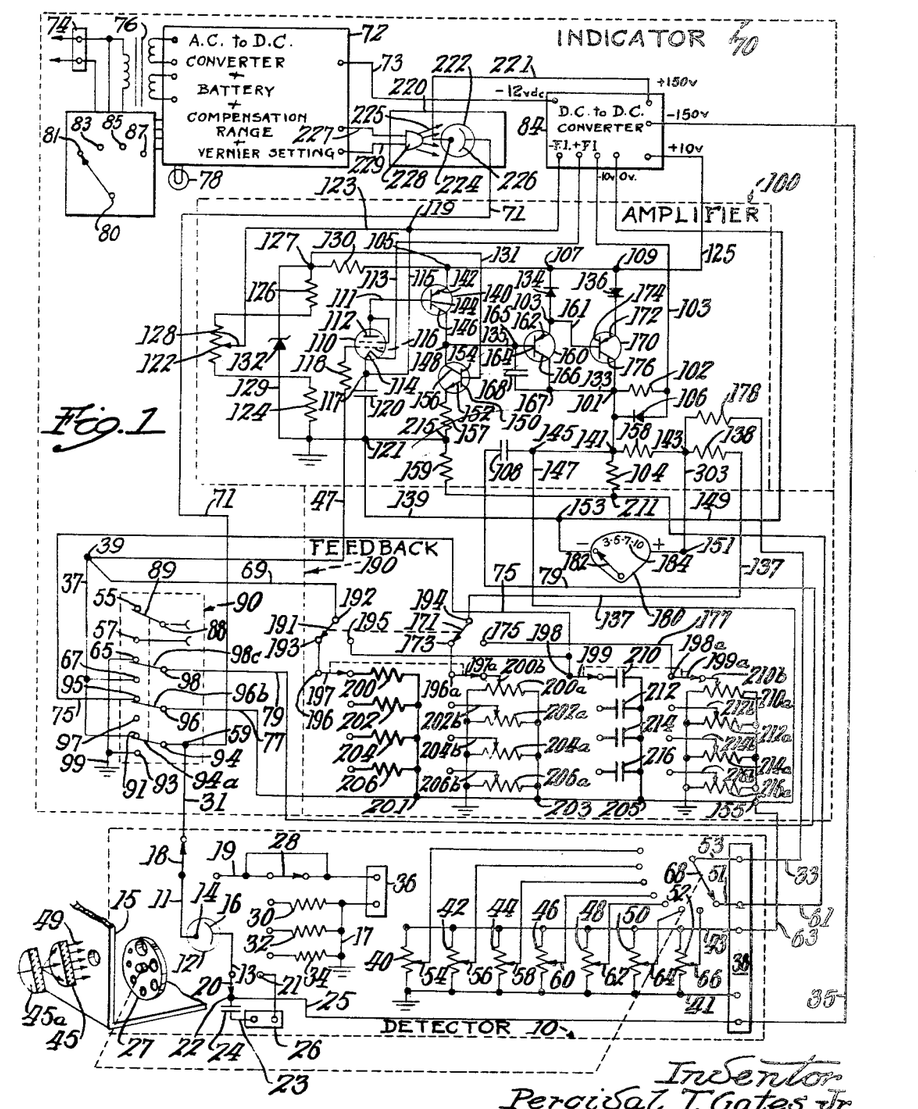
FIG. 1 is a diagrammatic and schematic illustration of the electronic components and electrical circuits and the mechanical aspects of one preferred apparatus constructed in accordance with and embodying the present invention.

The radiometer of the present invention essentially comprises two physically separate units; the detector system 10 and an indicator system 70 comprising the combination of elements and arrangement of parts illustrated in FIG. 1. For convenience and greater usefulness the detector and indicator systems are housed in physically separate units provided with suitable interconnecting cables and respective sockets to receive those cables. By so providing two physically separate units, the versatility of operation of the radiometer of the invention is greatly enhanced, as will become more apparent hereinafter For one thing, a number of different and interchangeable detector systems 10 may be provided to be utilized either by themselves or, as normally intended, in conjunction with indicator system 70. Furthermore, detector system 10, when desired, may be connected to a suitable oscilloscope (not shown) rather than to indicator system 70, visually to display waveforms of pulsed or modulated light. Differences in and further applications of various detector systems 10 will become more apparent from the description that follows.

It must be pointed out, however, that the radiometer of the present invention may be constructed as one physical unit, including both detector system 10 and indicator system 70. Such combination will, of necessity, reduce the versatility of application of the radiometer to the particular detector system 10 built ino the combined apparatus.

Referring to the drawings, in which like reference characters refer to like parts throughout the several views thereof, it will be convenient to consider briefly detector system 10. Detector system 10 essentially comprises a device 12, which may be any device that will produce an electric current related to the level of radiation incident on the device. Device 12 is thus basically a transducer and, as here shown, consists of a vacuum photocell having an anode 14 and a photosensitive cathode 16. As will become more apparent from a later portion of this description, the radiation, the intensity of which is to be measured, impinges upon transducer 12 and is translated thereby into a modulating electric current whose effective value will be measured and indicated by indicator system 70 or, if desired, may be displayed for visual observation on a cathode ray tube (not shown), as will be more fully described below.

INDICATOR SYSTEM 70

Indicator system 70 is essentially a multirange charge and current meter consisting of amplifier 100; feedback system 190 indicated within its respective dashed line; readout means 180; ambient compensation means 220; a conventional DC to DC converter 84; an AC to DC converter 72 including also a rechargeable battery, a compensation range and vernier setting for ambient compensation means 220, pilot light 78, power transformer 76 provided with plug 74 for connection to a standard 110–120 v. alternating current main source of electric power (not shown), four-position power switch 80; and three-position integrator switch 90. Thus, indicator system 70, in addition to being a multirange charge and current meter, also functions as system control and basic power supply for the radiometer of the invention.

POWER SYSTEM

The four positions of power switch 80 are illustrated diagrammatically as follows: position 83 corresponds to "off," position 85 corresponds to "line," position 87 corresponds to "battery" and the shown position 81 corresponds to "charge." Actual circuit connections of power switch 80 are not illustrated. With power switch 80 in its normal "off" position 83, plug 74 may be conveniently connected to a conventional alternating power source, and the radiometer of the invention is ready for operative use. In the "off" position 83, of course, all power is removed from the radiometer system, a condition which may be readily observed by pilot light 78 being unlighted. With the movement of power switch 80 to the position marked "line," position 85, all regulated power supplies of the radiometer system are energized directly from the AC line, a condition which is indicated by the blinking of pilot light 78. When the radiometer of the invention is intended for field use, it becomes desirable to check and, if necessary, recharge the rechargeable battery supplied with the system. This is accomplished by positioning power switch 80 in the "charge" position 81, as shown. During this recharging of the battery, pilot light 78 is on and is steady. After the battery is recharged, power switch 80 is again set to its normal "off" position 83 and plug 74 may then be disconnected from the AC source. Moving power switch 80 to the position marked "battery," position 87, energizes all regulated power supplies of the radiometer system from the rechargeable battery contained in the power system which condition is indicated by the blinking of pilot light 78.

When using power directly from the AC line in position 85, power transformer 76 and conventional AC to DC converter components produce a rectified potential of approximately —12 v. which is conducted by lead 73 to a conventional DC to DC converter 84. DC to DC converter 84 provides the various regulated potentials of direct current required to operate the component circuits of the radiometer system.

AMPLIFIER 100

One of the main components of indicator system 70 comprises amplifier 100, which is essentially an operational amplifier having a gain of at least —200, and has feedback system 190 connected between its input terminal 39 and output terminal 141. The characteristic action of amplifier 100, when all of its components are operational, is such as to maintain its input terminal 39 at substantially constant (such as zero) potential. It is a transistorized amplifier circuit with electrometer tube 110 serving as an input element. It is to be understood, however, that any known operational type amplifier may be used in the radiometer system of the invention. Also, electrometer tube 110 may be replaced by a field effect transistor at the expense of some accuracy in the system.

Electrometer tube 110 has anode 112, cathode 114 and control grid 116, which is connected by lead 47 and input resistor 118 to input terminal 39. Filament leads 113 and 115 supply cathode 114 with the necessary DC current from DC to DC converter 84 to heat the cathode and to maintain its required operating temperature during the operative use of the radiometer of the invention. Filament lead 115 is shown connected between point 117 of cathode 114 and point 119 which is, in turn, connected by lead 123 to the negative filament voltage in DC to DC converter 84. One side of capacitor 120, which serves as a bypass capacitor for electrometer tube 110, is also connected to point 117, while the other side of capacitor 120 is connected to grounded point 121. Adjustment of the electrical zero, with all systems being energized, is effected, as will be more fully explained below, through varying the position of wiper 128 along zero set potentiometer 122. It is to be noted in this regard that wiper 128 is directly connected through point 119 and lead 115 to cathode 114 of electrometer tube 110. Zero set potentiometer 122 forms, in effect, a voltage divider network in conjunction with resistor 124, one side of which is connected to ground, and series resistors 126 and 130 connected to bus line 125 which connects to positive direct-current potential in DC to DC converter 84. The divider voltage is further stabilized by Zener diode 132.

Transistor 140, which is a PNP transistor, is shown with its base 144 coupled by lead 111 directly to anode 112 of electrometer tube 110. Forward-biased emitter-base voltage for transistor 140 is provided to emitter 142 at point 105 on bus line 125, which supplies a positive potential on the order of about 10 v. direct-current from DC to DC converter 84. Collector 146 of transistor 140 and collector 156 of transistor 150 both connect to point 148.

Transistor 150 is an NPN transistor that functions as a steady current source for transistor 140. To achieve this, its base 154 is maintained at a steady positive potential by Zener diode 132, whose cathode is connected to base 154 by lead 131 at point 127. To maintain the current through emitter 152 substantially uniform over a wide range of temperatures, emitter dropping resistor 157 connects between emitter 152 and grounded point 121.

Transistor 160, which is a PNP transistor and functions as a driver, is shown having its base 164 connected to point 165 and by lead 135 to point 148 intermediate collectors 146 and 156 of transistors 140 and 150, respectively. To prevent undesirable oscillations in amplifier 100, stabilizing capacitor 168 is provided between collector 166 and base 164 and is also shown connected between points 165 and 167. Temperature compensation for transistor 160 is provided by reverse-biased junction diode 134 connected between point 107 on bus line 125 and emitter 162 of transistor 160.

The further transistor 170, also a PNP transistor, serves as the final stage of amplifier 100. It is shown with its base 174, directly coupled by lead 161 to emitter 162 of transistor 160 at point 103 intermediate the anode of junction diode 134 and emitter 162. The proper forward emitter-base bias for transistor 170 is provided by forward-biased junction diode 136 whose anode is connected to point 109 also located on bus line 125, and whose cathode is coupled to emitter 172. Collector 176 of transistor 170 is shown directly coupled to collector 166 of transistor 160 by lead 133 connecting points 101 and 167. Point 101 is, furthermore, directly connected to output terminal 141 of amplifier 100.

Collector voltages for transistors 160 and 170 are provided at point 101 by DC to DC converter 84 through lead 103 and dropping resistor 102. Lead 103 is connected to DC to DC converter 84 and is supplied with a negative voltage of about 10 v. direct-current. The size of dropping resistor 102 is chosen so as to provide suitable operating point currents for transistors 160 and 170. To prevent damage to the transistors, reverse-biased junction diode 106 is connected in parallel across dropping resistor 102 as shown.

METER READOUT MEANS 180

Output terminal 141 of amplifier 100 is connected through current-limiting resistor 158 by way of point 143 to positive terminal 151 of meter readout means 180. Meter readout means 180 is a microammeter having a large dial face that may be conveniently provided with a scale marked from 0 to 10, with subdivisions divided into tenths. A pivotable deflection needle 182 allows the operator to take direct readings in amperes or coulombs, as may be more fully apparent from the disclosure that follows. The negative terminal of meter readout means 180 is connected to point 153 which is, in turn, connected by lead 139 to grounded point 121 and also by lead 149 to zero voltage in DC to DC converter 84.

FEEDBACK SYSTEM 190

Figure 2A:
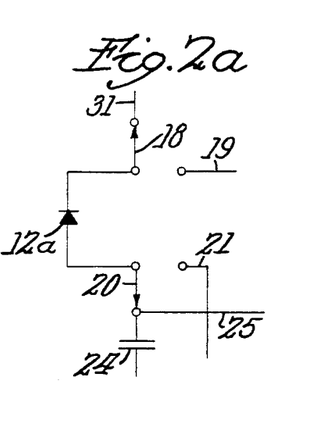
FIG. 2a is a diagrammatic indication of a modified portion of the diagram of FIG. 1, disclosing a different transducer, such as a reverse-biased P and N injuction diode.
Figure 2B:
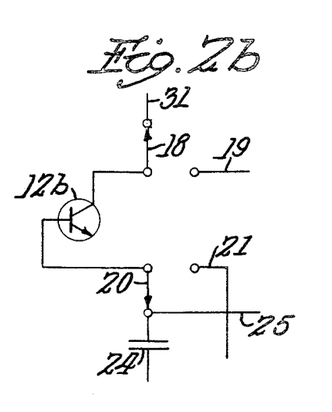
FIG. 2b is a view similar to that of FIG. 2a, but showing still another transducer, such as a reverse-biased collector-base junction of an NPN transistor with the emitter electrode open.
Figures 2C, 2D, 3:
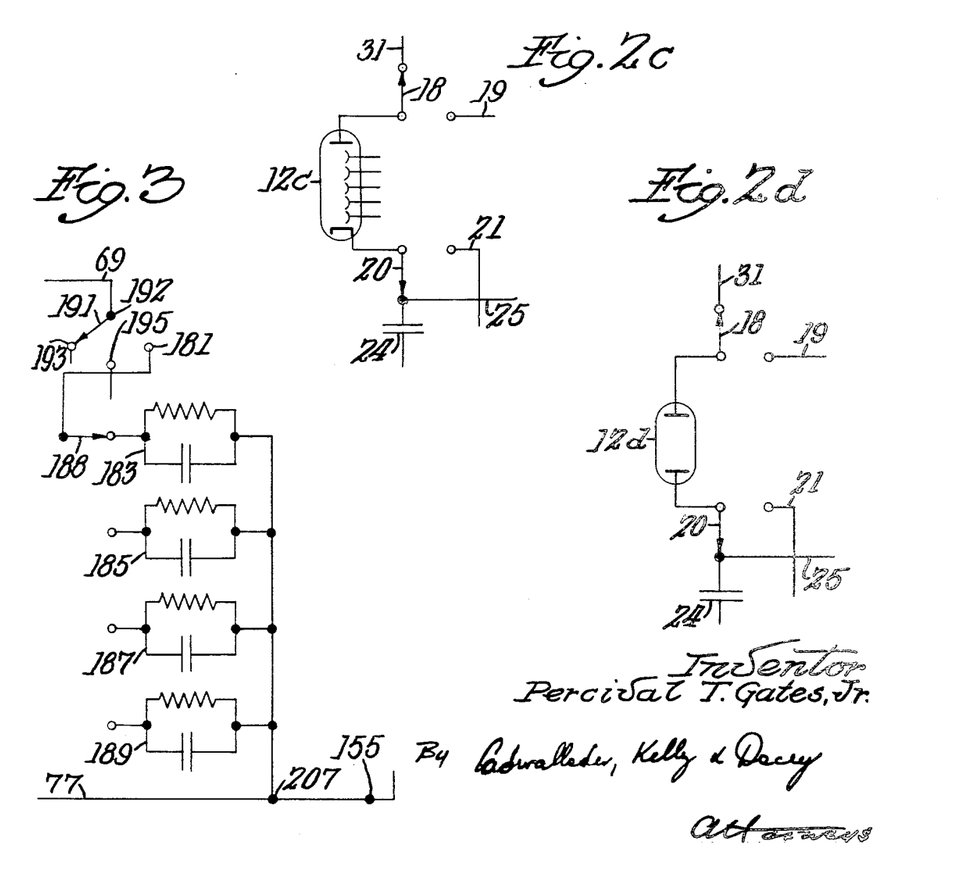
FIG. 2c is a view similar to that of FIG. 2a, but showing still another transducer, such as a photo-multiplier tube.
FIG. 2d is a view similar to that of FIG. 2a, but showing still another transducer, such as an ion chamber.
FIG. 3 is a diagrammatic indication of another modified portion of the diagram of FIG. 1 showing in particular a number of paired parallel-connected resistors and capacitors in the feedback system.

Feedback system 190 connects between input and output terminals 39 and 141, respectively, of amplifier 100. It develops a current as a result of the voltage generated at output 141. This current will be equal in magnitude to the current generated by transducer 12 in response to light impinging thereon. Feedback system 190 is essentially a multi-range current meter and a multi-range charge meter having means to adjust for inexactness in the manufacturing of the system components, i.e., the several resistors and capacitors. FIG. 3 shows a further modification in feedback system 190, illustrating a number of pairs of parallel-connected resistors and capacitors designed to measure average light power generated by pulses separated by wide time intervals.

As may be noted, a suitable function switch 192 that is one of the major operating controls, connects through lead 69 to input terminal 39. As depicted in FIG. 1, function switch 192 has two operative positions, 193 and 195, for measuring current and charge, respectively. In the modification shown in FIG. 3, it has a further position 181 for measuring average power. With contacting arm 191 of function switch 192 moved to position 193, the radiometer of the invention is set for evaluating steady light sources. At position 193, the current measuring circuit connects to meter readout means 180 for the measurement of signals in amperes generated by steady light sources, as will be more fully explained below. At position 195 the radiometer is set for measuring evaluating pulsed light sources.

Function switch 192 is ganged with switch 194 whose function is to select the appropriate scale trim potentiometer for adjustment of inexactness of the current or charge measuring circuit. As shown, ganged switch 194 may, by its contacting arm 171, be moved to contact 173 or to contact 175. Ampere multiplier switch 196 and coulomb multiplier switch 198 are shown connected to contacts 193 and 195, respectively. Ampere and coulomb multiplier switches 196 and 198 provide the several ranges for measuring current or charge, by their respective contacting arms 197 and 199 contacting one of several resistors 200, 202, 204 and 206, or one of several capacitors 210, 212, 214 and 216, respectively. The other side of these resistors and the other side of these capacitors are respectively connected to points 201 and 205 on lead 77 and thereby to point 155, which by lead 147 and point 145 is directly connected to output terminal 141 of amplifier 100. It is to be understood, of course, that feedback system 190 may also be designed to permit the simultaneous selection of one of resistors 200, 202, 204 or 206, and one of capacitors 210, 212, 214 or 216, to be both operational as parallel-connected feedback elements.

Each of the several current measuring resistors 200, 202, 204 and 206 has a different value for different ranges. While only four resistors are shown, the radiometer of the invention may be supplied with as many different current measuring resistors as the operative use of the radiometer system necessitates. Likewise, each of the several charge measuring integrating capacitors 210, 212, 214 and 216 has a different value for different ranges. Also, one may use as many different capacitors as may be necessary to perform the light evaluation problems for which the radiometer of the invention is to be used.

Since amplifier 100 is a high gain amplifier, it is important to provide circuit components of high precision, especially in feedback system 190 in order to achieve the desired degree of exactness in measuring and evaluating light sources. Feedback system 190 includes means whereby the effective value of the current or charge indicated by meter readout means 180 may be compensated for manufacturing inexactness in the current measuring resistors and the charge integrating capacitors. This means comprises two sets of scale trim potentiometers with one set being provided to adjust the effective values of the resistors and the other set to adjust the effective values of the capacitors. Thus, in the position shown in FIG. 1, contacting arm 197 of ampere-multiplier switch 196, is shown connected to resistor 200 and contacting arm 197a of ganged switch 196a is shown connected to wiper 200b. The position of wiper 200b is factory set along resistor 200a at the time of fabrication to compensate for the inexactness of resistor 200. One end of resistor 200a is connected at point 203 to lead 77 and thereby through point 155, lead 147 and point 145, to output terminal 141 of amplifier 100. The other end of resistor 200a is grounded, as shown. Wiper 200b is, in turn, connected by ganged switch 196a and ganged switch 194 to lead 137, and thence through dropping resistor 138 to point 143 which is, in turn, directly connected to current summation point 151 at the positive terminal of meter readout means 180. Thus, by the predetermined position of wiper 200b along resistor 200a, the deflection of needle 182 is adjusted so as to indicate the proper value of current through resistor 200. In like manner, the position of wiper 200b along resistor 202a adjusts the deflection of needle 182 so as to indicate the proper value of current through resistor 202. This holds true for each of the remaining current measuring resistors in feedback system 190.

When contacting arm 191 of function switch 192 is moved to position 195, the radiometer of the invention is set for measuring and evaluating pulsed light sources. Position 195, in effect, connects the charge measuring circuit to meter readout means 180 for the measurement in coulombs of signals generated by pulsed light sources that impinge on transducer 12. Position 195 directly connects to coulomb multiplier switch 198 which, by its contacting arm 199, permits selection of one of the several integrating capacitors 210, 212, 214 or 216. Correspondingly, ganged switch 194 through its contacting arm 171, is in position 175 which connects with switch 198a to adjust for inexactness in the selected particular capacitor.

More specifically, the effective value of the charge developed across one of the integrating capacitors is adjusted by means of scale trim potentiometers in like manner as described with reference to the current measuring circuit. Thus, by adjusting the position of wiper 210b along resistor 210a the deflection of needle 182 may be adjusted to indicate the correct value of the charge accumulated in capacitor 210. That this is so, may be observed in FIG. 1, where wiper 210b is connected by contacting arm 199a of switch 198a to point 175 which, in turn, through contacting arm 171 of switch 194, is connected through lead 137, across dropping resistor 138 through point 143 and back to current summation point 151. In like manner, the position of wiper 212b along resistor 212a may be varied to adjust the deflection of needle 182 so as to indicate the correct value of the charge accumulated in capacitor 212. This holds true for each of the remaining charge measuring integrating capacitors in feedback system 190. As may be observed, one end of each of resistors 210a, 212a, 214a and 216a is connected to point 155 on lead 77, and thence by lead 147 to point 145, which is directly connected to output 141 of amplifier 100. The other side of resistors 210a, 212a, 214a and 216a, is grounded, as shown.

As already stated, the operation of amplifier 100 is such as to produce at its output terminal 141, that voltage which is necessary to produce in the particular selected feedback element in feedback system 190, which element may be a resistor or a capacitor, a current that will be equal in magnitude to the current generated by transducer 12 in response to light impinging thereon. It is apparent that the radiometer of the invention is designed for precise measurements of light conditions, due to the means described, whereby the effective value of such current across the particular feedback element is factory adjusted for manufacturing inexactness in that element. It is also apparent that with the systems heretofore described, the radiometer of the invention would measure both the desired light as well as ambient light, were it not for ambient compensation means 220.

AMBIENT COMPENSATION

Ambient compensation means 220 comprises a light-tight container housing a second transducer 222 and a light-emitting means 228 designed for emitting light of variable intensity so directed as to impinge on second transducer 222. For best results, second transducer 222 is preferably a photocell as shown in FIG. 1, or it may be a photo-multiplier tube. Photocell 222 comprises anode electrode 224, which is shown connected by lead 221 to DC to DC converter 84 which supplies photocell 222 with the required high direct-current positive voltage, and cathode electrode 226 which is, in turn, connected by lead 71 directly to current summing point 59 to which is coupled through lead 31 and switch 18 anode electrode 14 of transducer 12. Now, if no light is permitted to impinge upon cathode electrode 226 of photocell 222, no electron current will flow in lead 71, and the entire output of transducer 12 will be coupled through lead 31, switch 94, switch arm 94a and lead 37 to input terminal 39 of amplifier 100. In such event, no ambient compensation is provided.

As may be observed from FIG. 1, light emitting means 228 is connected by leads 227 and 229 to a suitable compensation range and vernier setting integral with AC to DC converter 72. By selecting one of the compensation ranges provided and by adjusting the vernier setting, the intensity of light waves 225 impinging on photocell 222 may be conveniently adjusted and varied as it is well understood in the art.

Photocell 222 is a photo-emissive vacuum tube in which the amount of current flowing through the tube is modulated by or proportional to the intensity of light 225 impinging on the photo-sensitive surface of its cathode electrode 226. Such current flows in lead 71 and is of such polarity, as to reduce, by the same amount, at current summing point 59, the current generated by transducer 12 in response to light impinging thereon. By creating a current flow in lead 71 equal in amplitude to the current generated in transducer 12 by ambient light impinging thereon, the effect of the ambient light will be suppressed. Thus, when ambient compensation means 220 has been properly adjusted, as will be more fully expalined below, the radiometer of the invention will measure only the intensity of the unknown light source, even indirect sunlight.

INTEGRATE SWITCH 90

Integrate switch 90 is a specially ganged switch having three positions: RESET, INTEGRATE and HOLD. It comprises synchronizer switch 88 and switches 94, 96 and 98 which have contacting arms 89, 94a, 96b and 98c respectively. This switch is operated by a toggle which is not shown. The normal, unoperated position for switch 90 is shown in FIG. 1. Switch 90 is so arranged mechanically that when the toggle is moved from RESET to INTEGRATE only switches 88 and 96 operate with switches 94 and 98 remaining unoperated. Then when the toggle is moved from INTEGRATE to HOLD, switches 94 and 98 operate and switches 88 and 96 remain in their operated position. When the toggle is moved back to RESET these four switches return to the position shown in FIG. 1.

The RESET position effectively discharges the integrating capacitors in feedback system 190, and returns deflection needle 182 of meter readout means 180 to zero in preparation for measurement of pulsed light events. The RESET position is also the normal position for switch 90 for the measurement of steady light sources. As may be traced in the shown RESET position, the output of transducer 12 is coupled through lead 31 to point 59, and hence through contacting arm 94a of switch 94 to contact point 91, which is directly connected by lead 37 to input terminal 39 of amplifier 100. Switch 96, which connects by lead 77, through point 155 and lead 147 through point 145 directly to output terminal 141 of amplifier 100, is shown contacting point 95 through its contacting arm 96b. As may be traced, point 95 is connected by lead 75 directly to coulomb multiplier switch 198 in feedback system 190, thus providing a complete circuit path for the discharge of the integrating capacitors 210, 212, 214 and 216. Switch 98 of integrate switch 90 in the shown RESET position, effectively grounds one side of auxiliary capacitor 108, whose function will be more fully described below, by connecting one side of capacitor 108 through lead 79, contacting arm 98c, point 65 and lead 99 to ground. The other side of capacitor 108 is connected through point 145 directly to output terminal 141 of amplifier 100.

Integrate switch 90 preferably has a synchronizing switch 88 to initiate the pulsed event desired to be evaluated. Synchronizing switch 88 is shown as a single-pole double-throw switch which, in the RESET position, has its arm 89 contacting point 55, the normally open position.

When it is desired to evaluate a pulsed light event, the toggle is moved from the normal RESET position to INTEGRATE. Switches 96 and 88 operate and switches 94 and 98 remain unoperated. The following events occur in the sequence noted. First, contacting arm 96b of switch 96b of switch 96 moves from its position contacting point 95 to a position contacting point 97, thereby opening the discharge circuit path of the integrating capacitors in feedback system 190. Then contacting arm 89 of synchronizing switch 88 moves to a position contacting point 57 which closes a circuit, not shown, to initiate the pulsed light event to be measured. This triggering method eliminates the uncertainty of manual synchronization.

Following the termination of the pulsed light event to be measured, and with deflection needle 182 of meter readout means 180 being deflected along decimal scale 184, the toggle is moved from the INTEGRATE position to the HOLD position. During this motion of the toggle, switches 88 and 96 remain operated and switches 94 and 98 operate. The following events occur. First, contacting arm 94a of switch 94 moves from its position contacting point 91 to a position contacting point 93, which is connected by lead 99 to ground. The output of transducer 12 is thus effectively disconnected from input terminal 39 and is grounded. Simultaneously, contacting arm 98c of switch 98 moves from its present position contacting point 65, which is connected to ground, to a position contacting point 67, which is directly connected to point 91 and thence by lead 37 to input terminal 39 of amplifier 100. By this action of switch 98, the heretofore grounded side, through lead 79, of auxiliary capacitor 108 will be effectively connected to input terminal 39 of amplifier 100. Auxiliary capacitor 108 is preferably a very large capacitor compared with the smaller integrating capacitors in feedback system 190 and is designed to hold its charge, which is proportional to the charge accumulated on the selected smaller integrating capacitor, so as to permit accurate reading of meter readout means 180 following the pulsed event. Because of the large capacitance of auxiliary capacitor 108, the microammeter drift rate in the HOLD position is less than 0.1 percent of full scale in about 15 seconds.

As may be observed from FIG. 1, auxiliary capacitor 108 is not connected in feedback system 190. One side of auxiliary capacitor 108 is directly connected to output terminal 141 of amplifier 100, while the other side is grounded during the INTEGRATE position of integrate switch 90. Thus, during this time auxiliary capacitor 108 becomes charged directly from output terminal 141 of amplifier 100, while its other side remains grounded. Moreover, during this time, auxiliary capacitor 108 does not contribute to the deflection of deflection needle 182 along scale 184 of meter readout means 180. Only in the HOLD position of integrate switch 90, at which time due to the previously-described action of switch 98, the heretofore grounded side of the capacitor 108 becomes connected to input terminal 39 of amplifier 100, and after deflection needle 182 has already assumed its final position indicating the charge accumulated in the particular selected smaller integrating capacitor, does auxiliary capacitor 108 take control and hold deflection needle 182 in its deflected position along scale 184 of meter readout means 180. Once the position of deflection needle 182 has been noted and recorded, integrate switch 90 and the toggle may be returned to their normal RESET position, as shown in FIG. 1.

DETECTOR SYSTEM 10

Detector system 10 which, as has already been indicated, is normally and preferably housed in a separate unit as shown in FIG. 1 by reference character 15, essentially comprises a device 12 that is basically a transducer and is represented in FIG. 1 as a vacuum photocell having an anode 14 and a photo-sensitive cathode 16. Transducer 12 may also comprise a reverse-biased P and N junction 12a, as shown in FIG. 2a; a reverse-biased collector-base junction of an NPN transistor 12b, with the emitter open, as shown in FIG. 2b; a photo-multiplier tube 12c, as shown in FIG. 2c; or a suitable ion chamber 12d, as shown in FIG. 2d.

The selection of the particular transducer 12 for the detector system 10 will, of course, be dictated by the spectral range of interest under investigation, as well as by the nature and character of the radiation to be evaluated, i.e., whether it consists of light rays, X-rays, gamma or beta radiation, thermal neutrons, fast neutrons, or heat generated by an object. Furthermore, the photo-sensitivity of the particular photocell selected will depend upon the spectral response of interest, it being understood that a different photocell with a different photo-sensitive area will be required to measure and evaluate light events from the various segments of the spectrum. These various different transducers may, for convenience, be constructed as so many different and interchangeable detector systems 10, each one of which may be used with the indicator system, greatly enhancing thereby the operative usefulness and versatility in application of the radiometer of the invention.

In order optically to control the quantity of light reaching the photosensitive area of transducer 12, a rotatable member 27 is preferably provided inside container 15 adjacent transducer 12, and in the path of the light to be measured. Rotatable member 27 is shown as a disc having a plurality of different diameter apertures therethrough. By selecting one of these apertures in member 27 through the rotation thereof, the amount of light permitted to impinge on transducer 12 may be controlled. It must be pointed out that rotatable member 27 may, of course, comprise any known physical configuration that will optically limit the quantity of light permitted to impinge on transducer 12. In front of rotatable member 27 is mounted a suitable diffuser disc 45. Disc 45 is designed to intercept light from any direction, and to scatter it in all directions so that the quantity of light permitted to enter container 15 and pass through one of the apertures of rotatable member 27 will, in fact, illuminate the entire photosensitive surface of transducer 12 thereby rendering its response not directionally critical. As a result, uniform illumination of the photo-sensitive surface of transducer 12 effectively eliminates measurement errors that may have otherwise been occasioned by sensitivity variations from point-to-point over the photo-sensitive surface. Diffuser disc 45 may be conveniently mounted adjacent rotatable member 27 and in parallel-spaced-apart relation therefrom by any suitable tubular extension (not shown) that may be removably secured to container 15, such as by bayonet mounting. If desired, a convenient viewing hood (not shown) may also be provided for attachment to container 15 in conjunction with or in lieu of the mounting of diffuser disc 45. Such a viewing hood may be designed to restrict the field of view to a fixed degree of solid angle to suit the particular radiation evaluation desired to be performed.

When it is desired to use the radiometer of the invention to evaluate and measure narrow beam light sources such as those that may be generated by the ruby rod of a laser, it becomes necessary to mount a narrow beam adapted in front of diffuser disc 45. Such a narrow beam adapter may also comprise a second diffuser disc 45a that may be conveniently mounted in parallel-spaced-apart relation thereto by a further tubular extension (not shown), which may in turn be bayonet-mounted to the previously described extension incorporating the first diffuser disc 45. This second diffuser disc 45a functions to redistribute a narrow beam of light as scattered light over the operative area of the first diffuser disc 45, which then functions as already described.

When the radiometer of the invention is intended for use in evaluating and measuring heat, both diffuser discs 45 and 45a, as well as rotatable member 27, are omitted from detector system 10. Furthermore, one side of container 15 may likewise be removed to permit ready entrance of the heat to transducer 12. Transducer 12 in such instances will, of course, comprise either a reverse-biased junction diode 12a, as shown in FIG. 2a, or a reverse-biased collector-base junction of an NPN transistor 12b with the emitter open, as shown in FIG. 2b. Also, when measuring heat, function switch 192 is preferably set to contact, by its arm 191, point 193 in order to make one of the resistors operational as the current measuring feedback element in feedback system 190.

The use of photo-multiplier tube 12c, as shown in FIG. 2c, is intended to extend the dynamic range of the radiometer by permitting the evaluation of light of small intensity. Ion chamber 12d as shown in FIG. 2d, is, of course, used in detector system 10 when it is desired to measure various types of radiation. It must be pointed out that devices other than shown and described may be used in detector system 10 so long as transducer 12 acts to produce an electric current related to the level of radiation incident thereon.

Transducer 12, as shown in FIG. 1 is represented as a vacuum photocell in which the amount of current flowing through the tube is modulated by or proportional to the amount of light striking the photo-sensitive surface of the photocell. This phenomenon also includes, as will be understood, the conventionally known fact that a quantity of light impinging upon the photocell causes current flow in the photo-tube circuit which varies as the intensity of the light incident thereon. Anode electrode 14 of photocell 12 is shown connected by lead 11 to switch 18. Switch 18 functions to couple the output of photocell 12 to indicator system 70 through lead 31, as shown in FIG. 1, or it may function to couple the photocell output to plug 36 through lead 19, which plug 36 is provided for connection to a suitable oscilloscope, not shown.

When it is desired to couple the output of photocell 12 through plug 36 to a suitable oscilloscope, not shown, for visual display and examination of pulsed light events, it may be desirable to provide for variations in the signal sensitivity reaching the oscilloscope. This is provided in detector system 10 by external viewing multiplier switch 28 intended to connect either the position shown in FIG. 1, or one of the several different resistors 30, 32 and 34, respectively. As shown, one side of these resistors is effectively grounded by lead 17.

Cathode electrode 16 of photocell 12 is shown connected by lead 13 to another switch 20, which functions to couple the required negative direct current bias to the cathode. In the position shown, switch 20 connects with lead 25 whereby, through plug 38 and lead 35, the required negative direct current bias is obtained directly from DC to DC converter 84. By moving switch 20 from its shown position into a position contacting lead 21, the required negative direct current voltage for photocell 12 may be obtained from an independent external source (not shown), through plug 26. Provision is also made for a suitable storage capacitor 24 intended to supplement voltage in the event that photocell 12 is submitted to high intensity pulsed light events.

Detector system 10 is, furthermore, provided with a means by which the effective sizes of the apertures in rotatable member 27 may be selectively and electrically adjusted. This means for selectively and electrically adjusting the effective sizes of the apertures in rotatable member 27, comprises a number of scale trim potentiometers having resistors 40, 42, 44, 46, 48, 50 and 52, whose number is determined by the number of apertures provided in rotatable member 27. These scale trim resistors function in a manner similar to that described with reference to resistors 200a, 202a, 204a, 206a, 210a, 212a, 214a and 216a in feedback system 190 of amplifier 100. As may be observed in FIG. 1, one side of resistors 40, 42, 44, 46, 48, 50 and 52 is effectively grounded by lead 41, while the other side of the resistors is connected by a common lead 43, through plug 38 and lead 63 to point 155, and hence by lead 147 to point 145 and then directly to output terminal 141 of amplifier 100. Resistors 40, 42, 44, 46, 48, 50 and 52 are shown provided with wipers 54, 56, 58, 60, 62, 64 and 66, respectively. Each of these wipers is individually adjustable along the respective resistor, as is well understood. Aperture multiplier switch 68 is provided to select one of the applicable wipers of the scale trim potentiometers with respect to the selected aperture in rotatable member 27.

As already mentioned, aperture multiplier switch 68 constitutes means by which attenuation of the incident light striking the photo-sensitive surface of photocell 12 is attained, extending thereby the dynamic range of the radiometer of the invention even further. As may be traced, aperture multiplier switch 68 connects to lead 53, through plug 38 along lead 33, through dropping resistor 178 to point 143 and thence back by way of lead 303 to current summation point 151. Thus, the voltage at the particular selected wiper 54, 56, 58, 60, 62, 64 or 66 of the respective scale trim resistors 40, 42, 44, 46, 48, 50 and 52, is a constant but adjustable fraction of the amplifier output voltage allowing, thereby, for electrical adjustment in the effective sizes of the apertures in rotatable member 27 by changing the value of the current or charge indicated by meter readout means 180.

In the shown position of aperture multiplier switch 68, such adjustment is effected by a voltage divider network in amplifier 100, and is intended for use with the widest aperture of rotatable member 27. As may be traced, aperture multiplier switch 68 contacts with lead 51 and thence through plug 38 and lead 61 to point 211 in indicator system 70. Resistors 104 and 159 are shown connected to point 211, and form thus a voltage divider network for the current reaching point 211. As may be noted, the other end of resistor 104 is connected to output terminal 141 of amplifier 100, while the other end of resistor 159 is connected through point 215 to ground.

Thus, each of the three mentioned scale trim potentiometer sets—one to adjust for the effective sizes of the feedback resistors, another to adjust for the effective sizes of the feedback capacitors, and the last mentioned to adjust for the effective sizes of the apertures in rotatable member 27—do affect the value of the current or charge indicated by meter readout means 180. This is so because all these several scale trim potentiometers are connected by their respective wipers, through the circuits already described, to current summation point 151, the input to meter readout means 180.

CALIBRATION

The operative use of the radiometer of the invention is essentially as follows. Having selected the particular detector system 10 designed for the intended light measurement, with the auxiliary means, such as disc 45 and rotatable member 27, in place in the light path, detector system 10 is connected to indicator system 70 through plug 38 and lead 31. Indicator system 70 is then energized from either the connected external power source or the internal battery at the option of the operator by selecting the particular position of power switch 80. A short warm-up time thereafter will stabilize all circuits in indicator system 70, and the instrument is ready for zero adjustment. This is done by the following steps. The compensation range affecting light emitting means 228 is turned off thereby disconnecting ambient compensation means 220 from the system. Function switch 192 is then positioned with its contacting arm 191 contacting point 193, selecting thereby one of the feedback resistors as the operational feedback element in feedback system 190.

Thereafter, ampere multiplier switch 196 is positioned so that its contacting arm 197 connects with the least sensitive resistor that will take the most current, i.e., the smallest valued resistor among the several resistors, 200, 202, 204 and 206. Integrate switch 90 is then moved to the HOLD position. At this point, zero set wiper 128 in amplifier 100 is adjusted by moving it along resistor 122 until deflection needle 182 of meter readout means 180 reads exactly electrical zero. This electrical zero is then preferably verified by the other and more sensitive resistors by moving contacting arm 197 of ampere multiplier switch 196 to progressively higher valued resistors in feedback system 190. Once the electrical zero has been set, integrate switch 90 is returned to its normal RESET position.

The next step involves the adjustment for the proper ambient compensation of the system. Having connected indicator system 10 through plug 38 and lead 31 to indicator system 70, the required negative bias voltage on cathode electrode 16 of photocell 12 is applied from internal DC to DC converter 84. With aperture multiplier switch 68 in the shown position connecting lead 51, detector unit 10 is so positioned as to accept substantially the same ambient light that its transducer 12 will be subjected to during the intended light measurement. With function switch 192 in its shown current measurement position contacting point 193, deflection needle 182 will be deflected along scale 184, indicating the current reading generated by the ambient light. At this point, the compensation range integral with AC to DC converter 72 is selected so as to minimize the deflection of needle 182 along scale 184. This is effected by the intensity of light rays 225 emitted from light emitting means 228, which strike photo-sensitive surface 226 of second photocell 222 located in ambient compensation means 220. As a result, at point 59 most of the current generated by photocell 12 will be reduced by the current flow in lead 71. The vernier setting is then adjusted until meter readout means 180 reads precisely electrical zero. Such compensation adjustment should then be verified on the more sensitive ampere multiplier scales by moving switch 196. The vernier setting should then be adjusted until deflection needle 182 reads exactly zero. Since ambient light conditions are apt to vary, particularly outdoors, it is desirable always to adjust ambient compensation prior to taking a light measurement. Ambient compensation selected on the most sensitive, i.e., the highest valued feedback resistor will, of course, be correct for all the other less sensitive feedback resistors. The radiometer of the invention is thus ready to measure and evaluate steady light sources.

OPERATION

With the radiometer thus prepared for a steady light source measurement, the light source to be measured is then energized. Aperture multiplier switch 68 and ampere multiplier switch 196 are then set for maximum meter deflection of deflection needle 182 along scale 184. The final meter reading of meter readout means 180 is then noted, noting as well the particular setting of ampere and aperture multiplier switches 196 and 68. The final current indicated in amperes by meter readout means 180 will be proportional to the light viewed by detector system 10. The internal mechanism by which this is effected, will be more fully described with reference to the measurement of pulses light events.

In measuring a pulsed light event, detector system 10 is again positioned in a direction so as to accept substantially the same ambient light as will be viewed during the measurement. Function switch 192 is now set to measure charge by contacting point 195, selecting thereby one of the several integrating capacitors as the active feedback element in feedback system 190. Integrate switch 90 is then moved from its normal RESET position to the INTEGRATE position by moving the toggle. If ambient compensation means 220 has not been set, meter readout means 180 will indicate the integrated value of the ambient light. Once the ambient compensation adjustment has been set on the most sensitive coulomb multiplier position of switch 198, the toggle is moved to the HOLD position.

It is, of course, important to note that the intended pulsed light to be measured be properly centered and fully included in the field of view of detector system 10. When the operator is ready to take a measurement of a pulsed light event, he moves the toggle to the INTEGRATE position and, if integrate switch 90 as shown in FIG. 1 includes a triggering switch 88, will thereby also have triggered the pulsed light event to be measured. If the particular pulsed light event cannot be triggered or scheduled, integrate switch 90 must be advanced to the INTEGRATE position before the event starts. The unknown pulsed light source will then impinge on photo-sensitive surface 16 of photocell 12 generating thereby a modulated current whose amplitude will be related to the intensity of light striking it. This current flowing in lead 11, through switch 18 and lead 31 to point 59 will then be a current in addition to the current already flowing to point 59 responsive to the ambient light impinging upon photocell 12. This extra quantity of current reaching point 59 will be connected through switch 94 to input terminal 39 of amplifier 100.

It is to be understood that, with all systems of the radiometer being energized and with meter readout means 180 being adjusted to read electrical zero, each of the component transistors, as well as electrometer tube 110 of amplifier 100, are operating and drawing current.

Because of the inherent characteristic of amplifier 100, only a minute portion of the current reaching its input terminal 39 will be carried by lead 47 and through input resistor 118 to control grid 116 of electometer tube 110. The major portion of the current reaching input terminal 39 of amplifier 100 will be coupled by lead 69 back through function switch 192 to one of the selected charge measuring integrating capacitors 210, 212, 214 or 216, as selected by coulomb multiplier switch 198.

Since amplifier 100 produces an output current in the selected feedback element equal to the current produced by transducer 12, it will make the side of the selected integrating capacitor, which is connected to output terminal 141, go positive. The voltage thus produced on the integrating capacitor will be proportional to the total charge transferred by transducer 12 which is related to the radiant energy of the unknown pulsed light event.

Since the action of amplifier 100 is such as to maintain its input terminal at substantially zero voltage, the small minute current that is carried by lead 47 through input resistor 118 to control grid 116 will have the following effects upon amplifier 100. Due to this small current reaching control grid 116, the plate current flowing in lead 111 will be diminished somewhat. Since lead 111 is directly coupled to base 144 of transistor 140, the action of transistor 140 will be such as to draw somewhat less collector current from point 148. Since transistor 150 functions as a steady current source supplying point 148 with a steady flow of current, and since only a smaller portion of the current reaching point 148 now flows in collector lead 146, a larger current will flow away from point 148 through lead 135 directly to base electrode 164 of driver transistor 160. This substantial increase in the electron current flow in lead 135 away from point 148 and toward base 164 makes base electrode 164 go more negative and results in transistor 160 drawing a heavier collector current. Thus, a relatively small current change in lead 111, coupling base 144 of transistor 140 directly to plate 112 of electrometer tube 110, has produced a correspondingly much larger current change in base load 135 of transistor 160. Resultant increased conduction of transistor 160 will turn transistor 170 on even more, making it draw substantially more collector current because of the direct coupling by lead 161 of base electrode 174 to emitter electrode 162 of transistor 160. This increased collector current flowing away from point 101 requires a greater supply of direct current to be carried by lead 103 from DC to DC converter 84. The increased collector currents drawn by both collectors 176 and 166 of transistors 170 and 160 respectively, away from point 101, produces a greater voltage drop across resistor 102, making the end of resistor 102 nearest to point 101 go more and more positive. When operation has stabilized in amplifier 100, a voltage will have been developed at point 101, which is directly coupled to output terminal 141 of amplifier 100, that will produce in the particular selected feedback element in feedback system 190, an output current equal to the current produced by photocell 12 which is related to the radiant energy of the unknown pulsed light event. Deflection needle 182 is then deflected along scale 184 to provide a reading in coulombs.

With the end of the pulsed light event, the toggle is moved to the HOLD position, connecting thereby the heretofore grounded side of auxiliary capacitor 108 directly to input terminal 39 of amplifier 100, it being understood that auxiliary capacitor 108 during the INTEGRATE position has acquired the same voltage as the voltage of the charge accumulated on the particular selected integrating capacitor in feedback system 190. Auxiliary capacitor 108 will then hold already deflected needle 182 in its deflected position for a time more than sufficient to note the reading of meter readout means 180, as well as to note the positions of coulomb and aperture multiplier switches 198 and 68, respectively.

When measuring the average light power generated by slow pulsed events where the several pulses in a pulse train are separated from one another by relatively long time intervals, it is preferable to use in feedback system 190, a feedback element as shown in FIG. 3. Each such feedback element depicted in FIG. 3 comprises a resistor and a capacitor connected in parallel. A number of such paired parallel connected resistors and capacitors 183, 185, 187 and 189 are shown, one of which pairs may be conveniently selected as the operational feedback element by the positioning of contacting arm 188. For these applications, function switch 192, of course, contacts point 181. Although the several resistors have preferably different values of resistance, it is more important that the several capacitors have different values of capacitance. As the pulse interval is increased, for example, it becomes desirable to increase the sensitivity of the particular capacitor in the pair by selecting that pair of parallel connected resistor and capacitor in which the capacitor has a smaller value of capacitance that the capacitance of the capacitor in the previous pair.

EXAMPLE

By way of completing the disclosure of the illustrative embodiments of a radiometer according to the invention and without, of course, limiting the various arrangements and elements to those shown and described, it may be noted that satisfactory results have been achieved in the embodiments and circuitry hereinbefore recited by the use of the following values for the following elements of a radiometer as disclosed, although, as will be understood, the particular values recited in the following table are merely for illustrative purposes and not to be considered limiting on the construction of a radiometer for embodying and practicing the invention:

| Reference Numeral | Item | Rating |
|---|---|---|
| 24 | Capicitor | .10 mfd., 200 volts. |
| 30 | Resistor | 50 ohms. |
| 32 | do | 500 ohms. |
| 34 | do | 5,000 ohms. |
| 40, 42, 44, 46, 48, 50, 52. | Resistors | 200,000 ohms each. |
| 76 | Transformer | 110-120 v. AC to 12 v. AC. |
| 118 | Resistor | 22 megohms. |
| 122 | do | 5,000 ohms. |
| 124 | do | 10,000 ohms. |
| 126 | do | 16,000 ohms. |
| 130 | do | 12,000 ohms. |
| 102 | do | 20,000 ohms. |
| 158 | do | 124,000 ohms. |
| 138 | do | 453,000 ohms. |
| 178 | do | 332,000 ohms. |
| 104, 159 | Resistors | 100,000 ohms each. |
| 157 | Resistor | 2,700 ohms. |
| 132 | Zener diode | +6 v. DC Breakdown voltage |
| 120 | Capacitor | 150 mfd. |
| 168 | do | 390 pfd. |
| 108 | do | .002 mfd. |
| 200 | Resistor | 50 megohms. |
| 202 | do | 500 megohms. |
| 204 | do | 5,000 megohms. |
| 206 | do | 50,000 megohms. |
| 210 | Capacitor | .02 mfd. |
| 212 | do | .00 mfd. |
| 214 | do | 200 pfd. |
| 216 | do | 18 pfd. |
| 200a, 202a, 204a, 206a, 210a, 212a, 214a, 216a. | Resistors | 500,000 ohms each |

SUMMARY

The present invention thus provides an improved radiometer system for use in the evaluation of pulsed and steady light sources, a system that is characterized by a wide range of special response and a dynamic range of sensitivity that make it well suited to handling a great variety of light source evaluation problems in a relatively simple and easy manner.

Since certain changes may be made in the above described radiometer without departing from the scope of the invention herein involved, it is intended that all matter contained in the above disclosure or shown in the accompanying drawings shall be interpreted in an illustrative and not in a limiting sense.

What is claimed is:

1. Radiometer apparatus comprising:
   an amplifier having an input terminal and an output terminal;
   a radiation transducer coupled to the said input terminal for applying thereto a signal current proportional to the intensity of radiation impinging thereon;
   a feedback system connected between said input terminal and said output terminal, said amplifier further being adapted to produce an opposing current in said feedback system to maintain its input terminal at zero potential, said opposing current also being proportional to the current applied by said transducer to said input terminal; and
   indicator means coupled to the output of said amplifier and arranged to produce an indication proportional to the current in said feedback system.

2. Radiometer apparatus as in claim 1 in which said feedback system comprises storage means for storing electric energy proportional to the integral of the signal current applied by said transducer to said input terminal.

3. Radiometer apparatus as in claim 2 further comprising:
   additional storage means connected to the output terminal of said amplifier and having greater storage capacity than the first-mentioned storage means; and
   means for disconnecting said feedback system and said radiation transducer from said input terminal and for connecting said additional storage means between said output terminal and said input terminal.

4. Radiometer apparatus as in claim 2 further comprising means for applying a trimming potential to said indicator means for modifying the indication thereof.

5. Radiometer apparatus as in claim 2 in which said transducer is a photocell.

6. Radiometer apparatus as in claim 2 in which said transducer is a photo-multiplier.

7. Radiometer apparatus as in claim 2 in which said transducer is an ion chmaber.

8. Radiometer apparatus as in claim 2 in which said transducer is a reverse-biased P and N junction diode.

9. Radiometer apparatus as in claim 2 in which said transducer is an NPN transistor having a reverse-biased collector-base junction with the emitter open.

10. Radiometer apparatus comprising:
    an operational amplifier having an input terminal and an output terminal;
    a radiation transducer coupled to the said input terminal for applying thereto a signal current proportional to the intensity of radiation impinging thereon;
    a feedback system connected between said input terminal and said output terminal comprising
       a plurality of different resistors,
       a plurality of different capacitors, and
       switching circuit means adapted to select one of said resistors as an operational feedback element when measuring steady-state radiation, and to select one of said capacitors as an operational feedback element when measuring pulsed radiation, said operational amplifier further being adapted to produce an opposing current in said feedback system to maintain its input terminal at zero potential, said opposing current being proportional to the current applied by said transducer to said input terminal; and
    indicator means coupled to the output of said amplifier and arranged to produce an indication proportional to the current in said feedback system.

11. Radiometer apparatus as in claim 10 further comprising:
    additional capacitor means connected to the output terminal of said amplifier and having greater energy storage capacity than any of the first-mentioned capacitors; and
    means for disconnecting said feedback system and said radiation transducer from said input terminal and for connecting said additional capacitor means between said output terminal and said input terminal.

12. Radiometer apparatus comprising:
    an operational amplifier having an input terminal and an output terminal, and having an inherent tendency to maintain its input terminal at zero potential;
    a first radiation transducer coupled to the said input terminal for applying thereto a first signal component proportional to the intensity of radiation to be measured impinging thereon and a second signal component proportional to the intensity of ambient radiation impinging thereon;
    a light sensitive transducer coupled to said input terminal and adjustable light-emitting means mounted adjacent said light sensitive transducer and adapted to emit light of variable intensity to impinge thereon to produce a signal component at said input terminal opposing said second signal component;
    indicator means coupled to the output terminal of said amplifier and arranged to produce an indication proportional to said first signal component; and
    a feedback system connected between said input terminal and said output terminal comprising
       a plurality of different resistors,
       a first set of trimming potentiometers consisting of one trimming potentiometer corresponding to each of said plurality of resistors,
       a plurality of capacitors, a second set of trimming potentiometers consisting of one trimming potentiometer corresponding to each of said plurality of capacitors, and switching circuit means adapted to select one of said resistors as an operational feedback element when measuring steady-state radiation and to connect its corresponding trimming potentiometer to said indicator means to apply a trimming potential thereto to compensate for manufacturing inexactness in the value of said resistor, and to select one of said capacitors as an operational feedback element when measuring pulsed radiation and to connect its corresponding trimming potentiometer to said indicator means to apply a trimming potential thereto to compensate for manufacturing inexactness in the value of said capacitor.

13. Radiometer apparatus as in claim 12 further comprising:

means for selectively providing any one of a plurality of apertures through which said first transducer may be exposed to radiation to be measured and to ambient radiation;

a third set of trimming potentiometers consisting of one trimming potentiometer corresponding to each of said plurality of apertures; and adidtional switching circuit means adapted to connect the trimming potentiometer corresponding to a selected aperture to said indicator means to apply a trimming potential thereto to adjust electrically for the effective size of said aperture.

References Cited

UNITED STATES PATENTS

| | | | |
|---|---|---|---|
| 2,675,483 | 4/1954 | Leighton et al. | 250—83 X |
| 2,825,817 | 3/1958 | North | 250—105 |
| 2,999,935 | 9/1961 | Foster | 250—105 X |
| 3,069,545 | 12/1962 | Lide et al. | 250—83.3 X |
| 3,179,805 | 4/1965 | Astheimer | 250—83.3 |
| 3,269,254 | 8/1966 | Cooper et al. | 250—237 X |

ARCHIE R. BORCHELT, *Primary Examiner.*

UNITED STATES PATENT OFFICE
CERTIFICATE OF CORRECTION

Patent No. 3,398,279                                  August 20, 1968

Percival T. Gates, Jr.

It is certified that error appears in the above identified patent and that said Letters Patent are hereby corrected as shown below:

Column 1, lines 41 to 46, cancel "The radiometer of the invention is characterized by a wide range of spectral response and a dynamic range and sensitivity that make it eminently suited to handling a variety of light source evaluation problems.". Column 4, line 24, "ino" should read -- into --. Column 10, line 9, "96b of switch" should be canceled. Column 12, line 62, before "voltage" insert -- the supply --. Column 17, in the table, third column, line 27 thereof, ".00 mfd." should read -- .002 mfd. --; line 35, "special" should read -- spectral --. Column 18, line 9, "chmaber" should read -- chamber --. Column 20, line 7, "adidtional" should read -- additional --.

Signed and sealed this 17th day of February 1970.

(SEAL)
Attest:

Edward M. Fletcher, Jr.                      WILLIAM E. SCHUYLER, JR.

Attesting Officer                                Commissioner of Patents